United States Patent

[11] 3,631,435

| [72] | Inventor | George H. Elenbaas<br>814 Hiawatha Drive, Elkhart, Ind. 46514 |
| --- | --- | --- |
| [21] | Appl. No. | 726,096 |
| [22] | Filed | May 2, 1968 |
| [45] | Patented | Dec. 28, 1971 |

[54] TORNADO SENSING DEVICE
5 Claims, 4 Drawing Figs.

[52] U.S. Cl. ........................................................... 340/236,
73/170, 73/387
[51] Int. Cl. ........................................................... G08b 21/00
[50] Field of Search ........................................... 340/236,
421, 27, 240; 73/170, 393, 387, 410, 417;
200/61.51, 83.4, 166 M; 307/118

[56] References Cited
UNITED STATES PATENTS

| 2,723,388 | 11/1955 | Jacobs | 340/236 |
| --- | --- | --- | --- |
| 2,738,392 | 3/1956 | Talbott, Jr. | 73/170 UX |
| 2,801,408 | 7/1957 | Drasky | 340/236 |
| 3,301,062 | 1/1967 | Reesby et al. | 73/393 |

*Primary Examiner*—John W. Caldwell
*Assistant Examiner*—Daniel Myer
*Attorneys*—Marmaduke A. Hobbs and Kemon, Palmer, Stewart & Estabrook

ABSTRACT: A tornado warning device in which an electrical signal means is controlled by an electric circuit having a switch responsive to barometric pressure and a means for adjusting the switch to compensate for normal changes in barometric pressure. The adjustment means can readily be set and the circuit tested after a condition favorable for tornadoes has been reported or observed.

Patented Dec. 28, 1971
3,631,435
2 Sheets-Sheet 1
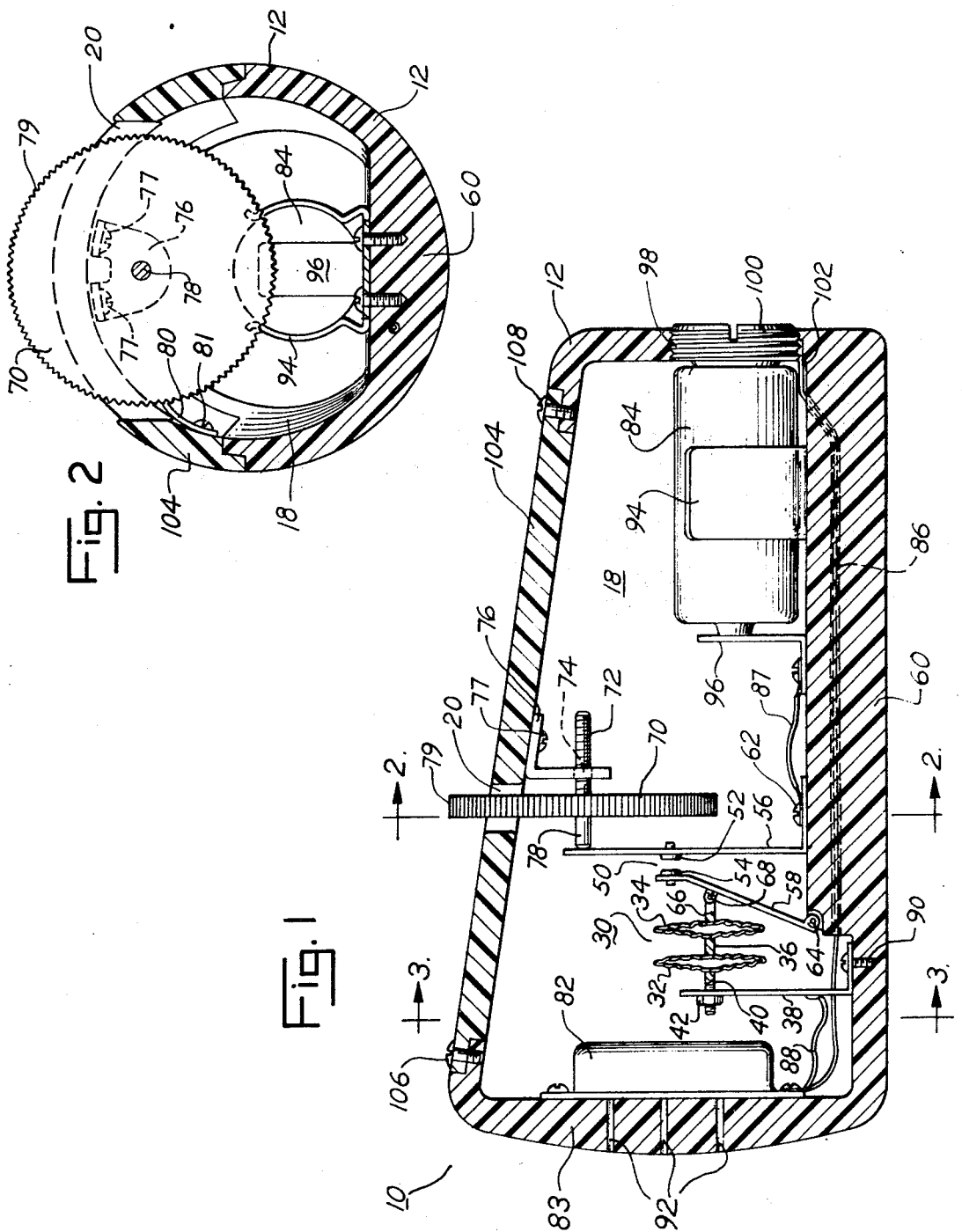
INVENTOR
GEORGE H. ELENBAAS
BY M.A. Hobbs
ATTORNEY

TORNADO SENSING DEVICE

It is well known that during the time a tornado is in the immediate vicinity, the barometric pressure is unusually low, usually dropping rapidly as the tornado approaches and then returning promptly to the normal barometric range for the weather conditions generally prevailing in the area. While a sudden barometric pressure drop occurs during the presence of the tornado in the vicinity, there is no definite barometer reading at which the sudden drop in pressure occurs or is likely to occur and no definite relationship between the actual barometric pressure and the magnitude of the pressure drop or the minimum reached during the sudden drop in pressure. For example, the barometric pressure for the area in which a tornado is likely to occur may be relatively high so that the start of the sudden drop and the minimum reached during the drop may be within the normal barometric pressure range. Prior tornado warning devices have endeavored to utilize the sudden pressure drop when a tornado is approaching or is in the vicinity, but they have generally failed to compensate for general barometric conditions in the area, and have, as a result, given false warning signals, either responding to low general barometric pressure conditions to give a signal that a tornado is in the vicinity when there is none, or not responding to the sudden drop resulting from a tornado when there is a high-barometric condition in the area. Thus, these prior warning devices were generally unreliable and dangerous to any one relying on them for a tornado warning. It is therefore one of the principal objects of the present invention to provide a tornado sensing and warning device which takes into account the general barometric pressure conditions of the area and superposes onto this reading the sudden drop in pressure which occurs in response to the presence of a tornado in the vicinity, to give a reliable tornado warning signal.

Another object of the invention is to provide a relatively simple tornado warning device which can easily and quickly be set to existing general barometric conditions to obtain accurate and ready response to an approaching tornado, and which is convenient to use and carry from place to place when weather conditions favorable to tornadoes exist in the area, so that it can effectively warn those relying on the device.

Still another object of the invention is to provide a device of the aforesaid type utilizing sound, such as a buzzer, or a light, such as a red bulb, as the signal, which can be set in the dark by sound and feel for warning of an approaching tornado, and which can likewise be set by sight and feel to permit deaf persons to set the device for proper tornado warning.

Additional objects and advantages of the invention will become apparent from the following description and accompanying drawings, wherein:

FIG. 1 is a longitudinal cross-sectional view through the device showing the various parts in proper operating relationship;

FIG. 2 is a transverse cross-sectional view, the section being taken on line 2—2 of FIG. 1;

Figure 3:
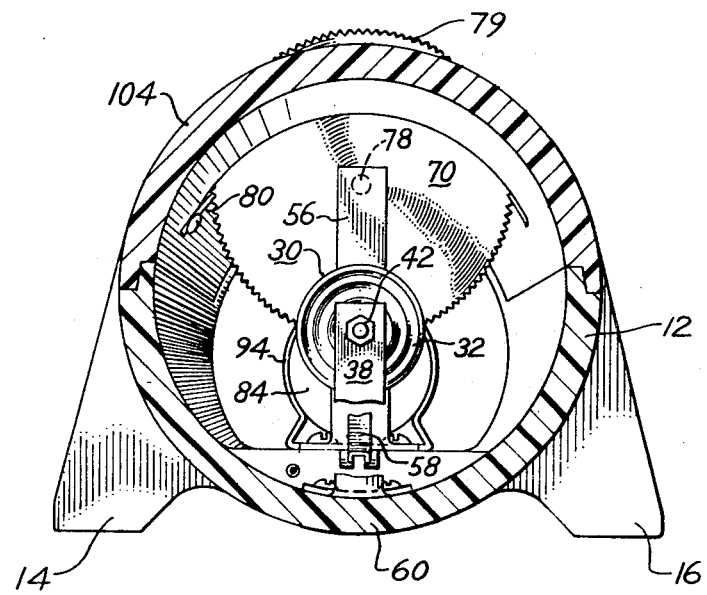
FIG. 3 is another transverse cross-sectional view, the section being taken on line 3—3 of FIG. 1.

Referring more specifically to the drawings, numeral 10 indicates generally the present tornado sensing and warning device having in this embodiment a horizontally positioned, generally cylindrical-shaped housing 12 and legs 14 and 16 for maintaining the housing in an upright position. The device shown in the drawings is full size and can easily be carried from place to place and retained close to the person or persons relying on the device for a tornado warning. Various-shaped housings or cases may be used, and the device may be made smaller so that it can be carried in a pocket or purse, or it may be made in such a manner that it can be mounted on a wall or other permanent supporting structure.

The housing shown in the drawings contains a chamber 18 communicating with the atmosphere, through an opening 20 or other suitable openings, which permit any change in the barometric pressure to be immediately communicated to chamber 18. The chamber contains a pressure-sensing means 30, the one shown in the drawing consisting of diaphragms 32 and 34 connected to one another by a stem 36. The two diaphragms are mounted on a rigid support 38 to which they are secured by a stem 40 extending through the support, and being adjustably secured thereto by a nut 42 threadedly received on the outer end of stem 40. Each of the two diaphragms consists of disc-shaped walls joined to one another at their peripheries to form an enclosed chamber. The diaphragms are preferably made of brass or other suitable metal, and are flexible, to permit the walls to move inwardly and outwardly as the barometric pressure decreases and increases.

The pressure-sensing means 30 controls a switch 50 having contacts 52 and 54 mounted on metallic arms 56 and 58, respectively. Arm 56 is rigidly secured to base 60 of housing 12 by a screw 62, and arm 58 is pivotally connected to base 60 by a pin 64. Arm 58 and contact 54 are movable toward and away from contact 52 by pressure sensing means 30, which is connected to arm 58 by a stem 66 and a pivot connection 68.

Arm 56 is constructed of relatively stiff but flexible metal and is adjustable toward and away from arm 58 by an adjustment wheel 70 mounted on a threaded screw 72 which is threadedly received in an opening 74 of support bracket 76, the bracket being connected to the upper portion of the housing by screws 77. A stem 78 axially aligned and preferably formed integrally with screw 72 projects from wheel 70 into contact with the upper end of arm 56. Rotation of wheel 70 in one direction causes screw 72 and stem 78 to move forwardly, and rotation of the wheel in the opposite direction causes the screw to rotate and move the stem rearwardly, thus adjusting the position of contact 52 relative to contact 54. The wheel is retained in any adjusted position by the serrations 79 on the periphery of wheel 70 and a leaf spring 80 connected to the sidewall of the housing by a screw 81. The end of spring 80 projects into the serrations which form an increment representative of degrees of change in barometric pressure. When contact 52 is properly set with respect to contact 54 in preparation for a warning signal, movement of the pressure responsive means 30 will close the contacts in response to a sudden or drastic decrease in barometric pressure during the relatively short tornado watch period.

The warning device shown in the drawings consists of a buzzer 82 mounted on end wall 83 of housing 12, and connected to a battery 84 by lead 86 and to the metallic support member 38 by a lead 88. The support is rigidly secured to base 60 by a screw 90, thus causing any change in bellows 32 and 34 to be transmitted directly and fully to arm 58. In order to permit the sound to be effectively transmitted from the housing, a plurality of holes 92 are provided in wall 83. The battery is retained in a holder 94 and a contact element 96 is provided at the inner end of the battery which in turn is connected by wire 87 to arm 56, the battery being inserted in holder 94 through an opening 98 which is closed by a screw-threaded plug 100. Plug 100 is constructed of metal and is electrically connected to lead 86 at point 102 so that an effective connection is made between lead 86 and the adjacent end of battery 84, thus completing the electrical circuit when switch 50 is closed. While the battery is normally serviced through opening 98 after plug 100 has been removed, the device preferably has a cover 104 which is secured to the remainder of the housing by screws 106 and 108.

Figure 4:
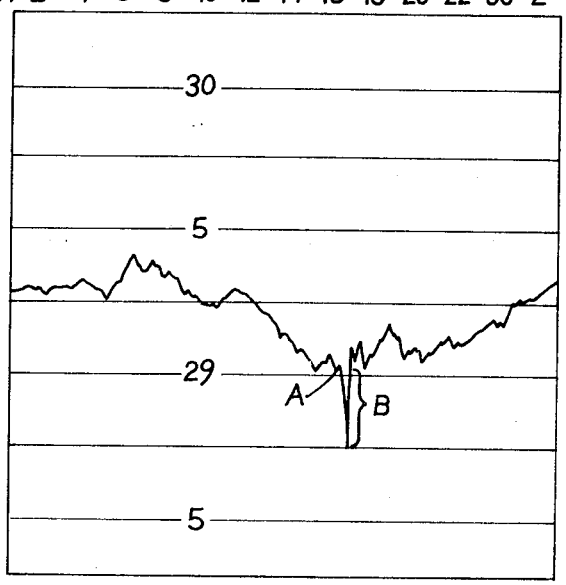
FIG. 4 is a barograph illustrating a typical curve for a day in which a tornado occurred in the vicinity of the barograph.

Whenever there is a warning, either by radio or television, or when conditions such as thunder clouds or hail are observed which may be favorable to the spawning of tornadoes, the present device is prepared for use. This is accomplished by rotating wheel 70 until the two contacts 52 and 54 are together, thus completing the electrical circuit and actuating the buzzer. The wheel is then rotated in the opposite direction, one, two or three notches, depending upon the degrees of barometric pressure which each notch represents. As the barometric pressure follows a line similar to that shown in the left half of FIG. 4, the device remains silent. When the barometric pressure reaches a point indicated on the graph by the letter "A," the pressure transmitted to chamber 18 externally of the two bellows 32 and 34 causes the bellows to expand, moving arm 58 and contact 54 to the right, as viewed in FIG. 1, thereby closing switch 50, and completing the circuit between battery 84 and buzzer 82, causing the buzzer to produce a warning signal. This signal will continue as long as the barometric pressure is in the drastic lowered area represented by "B," and upon return of the pressure from this area, the buzzer will cease to operate, thus indicating an all clear condition.

It is seen that the present device can readily be adjusted to the normal barometric pressure for the area, thereby eliminating one of the principal errors which has occurred in previous warning devices. After the device has been set to meet prevailing normal local conditions, it is ready for giving an accurate tornado warning when the sudden and drastic pressure drop occurs, as represented by "A" on the chart of FIG. 4. Generally the barometric pressure for an area will remain substantially constant over a period of several hours so that it is not necessary to constantly reset wheel 70. However, the conditions favorable to the formation of tornadoes usually exist only for a period of less than an hour.

While a buzzer has been shown as the ultimate signal, a red light or any other suitable signal device may be used, either alone or in conjunction with the buzzer, so that the device can be an effective warning means to those unable to hear the buzzer. Since the wheel is adjusted by first closing the switch and then backing the wheel away sufficiently to open the switch, one, two or three notches representing the required setting, the device can easily and accurately be set in the dark and during disruptive conditions. By rotating the wheel to first close the switch, the system including the battery is also tested to determine whether the system is operable and can be depended upon to give the signal at the proper time.

While only one embodiment of the invention has been described in detail herein, various changes may be made without departing from the scope of the invention.

I claim:

1. A tornado sensing and warning device comprising an electrical signal means, a circuit for said signal means, a switch in said circuit having a pair of relatively movable contacts, members supporting said contacts, manually operable means for adjusting the space between said contacts to obtain a predetermined spacing between said contacts at any given time and thereby to compensate for normal changes in barometric pressure, a pressure-responsive means connected to one of said members for closing said contacts when there is a sudden drop in barometric pressure, and a source of electrical current for said circuit, said means for adjusting said contacts relative to one another including a screw-threaded stem, a support for said stem, a wheel mounted on said stem, an annular row of notches concentric with said stem representing degrees of barometric pressure, and a detent for retaining said wheel in any adjusted position.

2. A tornado sensing and warning device as defined in claim 1 in which said notches are on the periphery of said wheel.

3. A tornado sensing and warning device as defined in claim 1 in which said pressure-responsive means consists of a diaphragm, a stem connecting said diaphragm to one of said contact members, and a support for said diaphragm, whereby changes in barometric pressure cause said diaphragm to expand or contract and to move one of said contacts toward or away from said other contact.

4. A tornado sensing and warning device as defined in claim 1 in which said signal means is a buzzer and said source of electrical current is a battery.

5. A tornado sensing and warning device as defined in claim 1 in which said pressure-responsive means includes a pair of diaphragms connected to one another, a stem connecting said diaphragms to one of said contact members, a support for said diaphragms, and a stem connecting said diaphragms to said support.

* * * * *